INVENTOR.
GEORGE R. LUM
BY
McMorrow, Berman & Davidson
ATTORNEYS

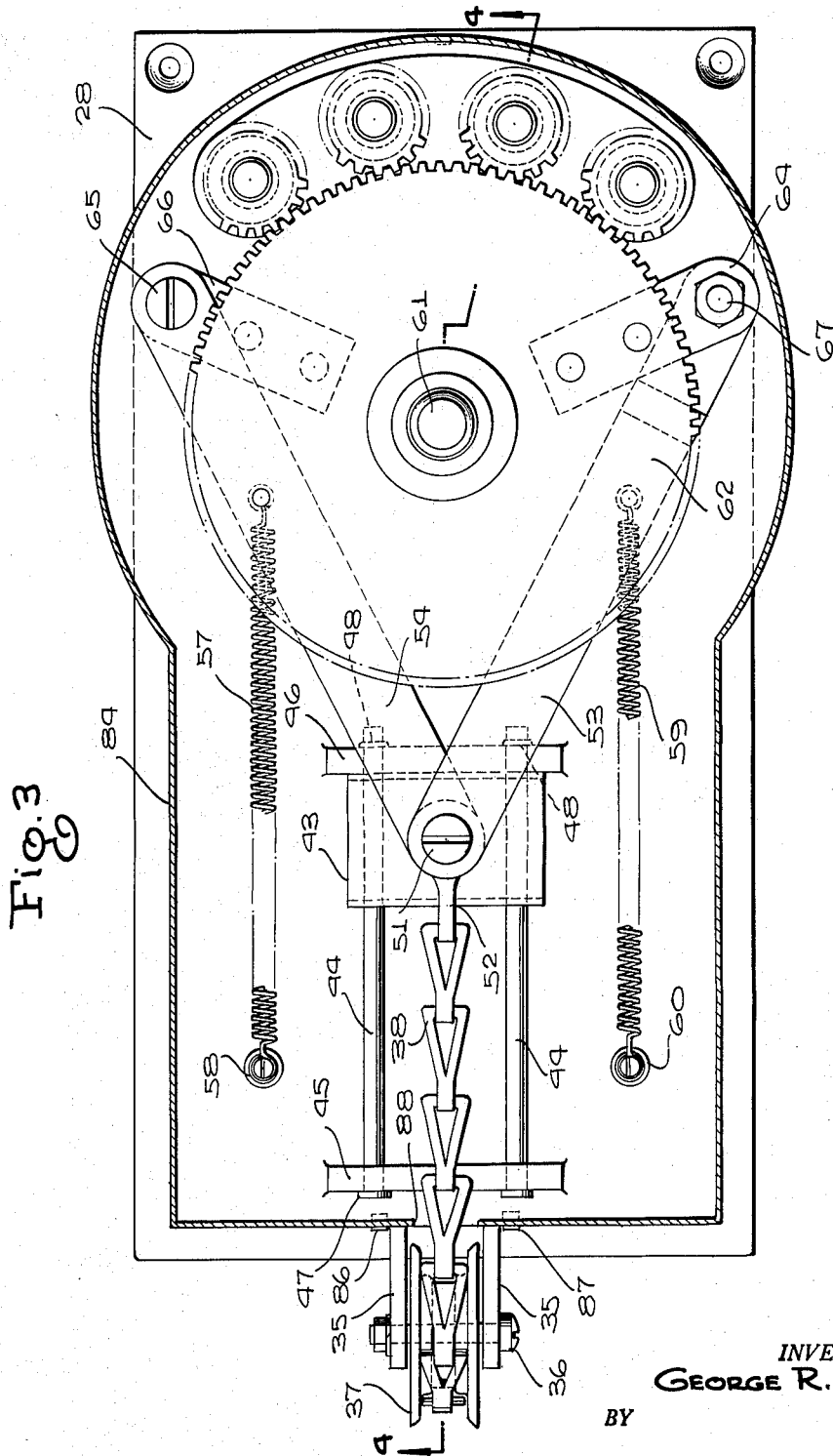

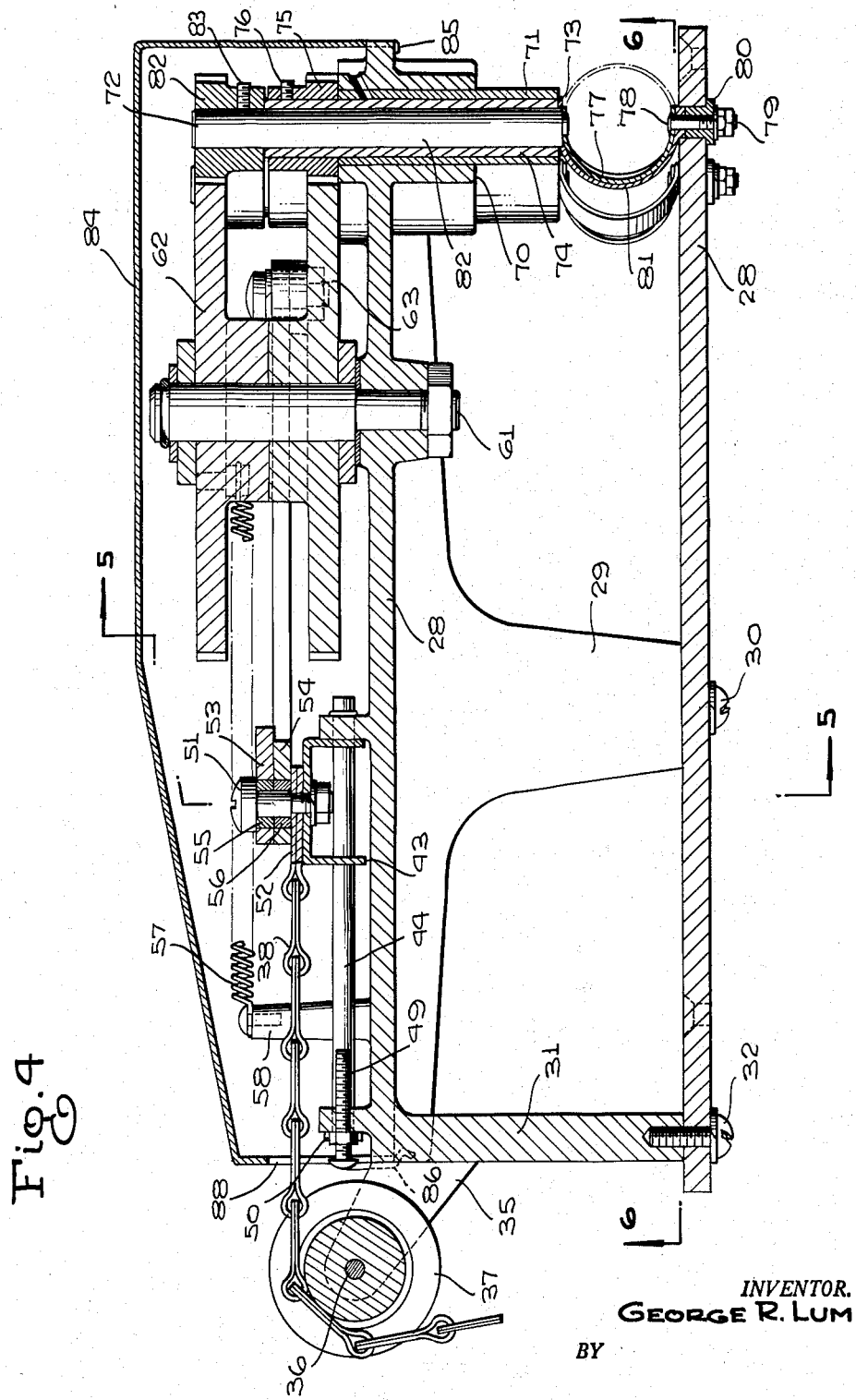

April 17, 1956
G. R. LUM
2,742,069
MELON BALL CUTTING MACHINE
Filed Oct. 30, 1953
4 Sheets-Sheet 4
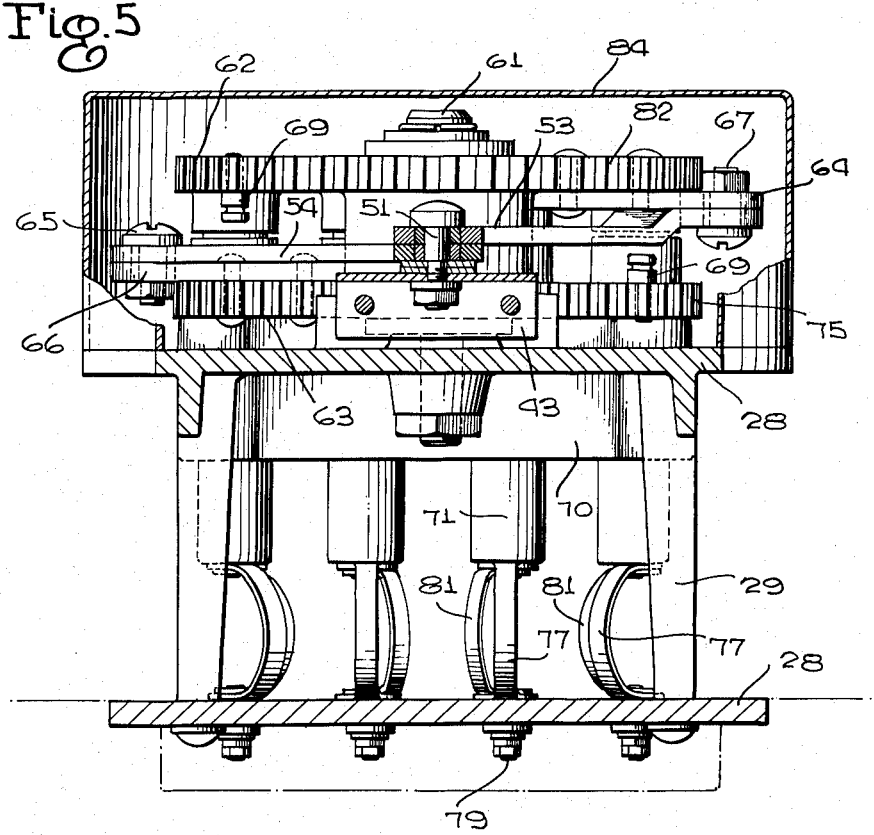
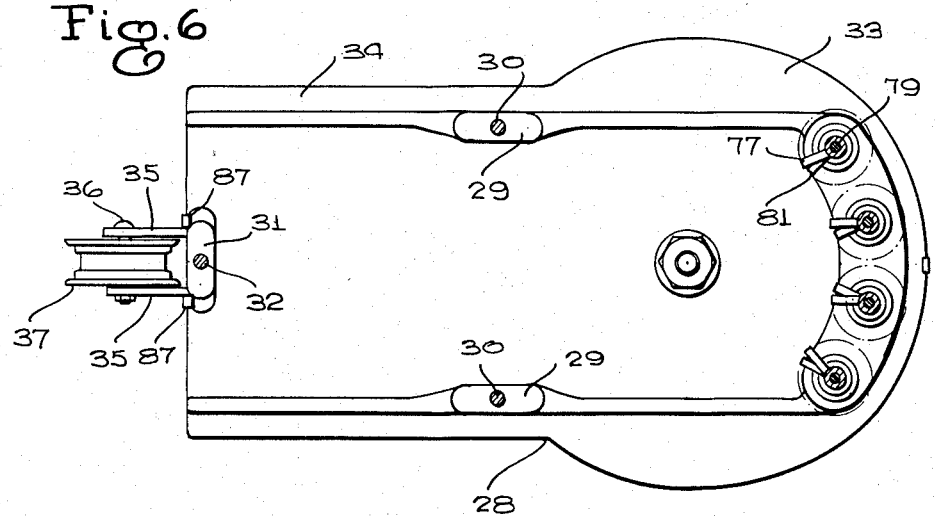
INVENTOR.
GEORGE R. LUM
BY
McMorrow, Berman + Davidson
ATTORNEYS

# United States Patent Office 2,742,069
Patented Apr. 17, 1956

2,742,069
MELON BALL CUTTING MACHINE

George R. Lum, South Wilton, Conn.

Application October 30, 1953, Serial No. 389,287

8 Claims. (Cl. 146—106)

This invention relates to food processing apparatus, and more particularly to a machine for cutting pieces of circular cross sectional shape from melons or other food objects.

The main object of the invention is to provide a novel and improved food cutting machine which is simple in construction, which is easy to operate, and which is arranged so that a plurality of balls or other shapes of circular cross section may be cut from melons or similar fruit articles simultaneously.

A further object of the invention is to provide an improved machine for cutting melon balls or similar shapes of circular cross section from food objects such as melons or the like, said machine being inexpensive to fabricate, being rugged in construction, being reliable in operation, and being economical to use.

A still further object of the invention is to provide an improved melon ball cutting machine which involves relatively few parts, which is compact in size, and which can be operated by a relatively unskilled person, the machine being arranged so that balls or other shapes of circular cross section may be cut from melons or similar food articles rapidly and with a minimum amount of effort on the part of the operator.

Further objects and advantages of the invention will become apparent from the following description and claims, and from the accompanying drawings, wherein:

Figure 3 is an enlarged horizontal cross sectional view taken on the line 3—3 of Figure 2.

Figure 4 is a cross sectional view taken on the line 4—4 of Figure 3.

Figure 5 is a transverse vertical cross sectional view taken on the line 5—5 of Figure 4.

Figure 6 is a cross sectional view, reduced in scale, taken on the line 6—6 of Figure 4.

Figure 2:
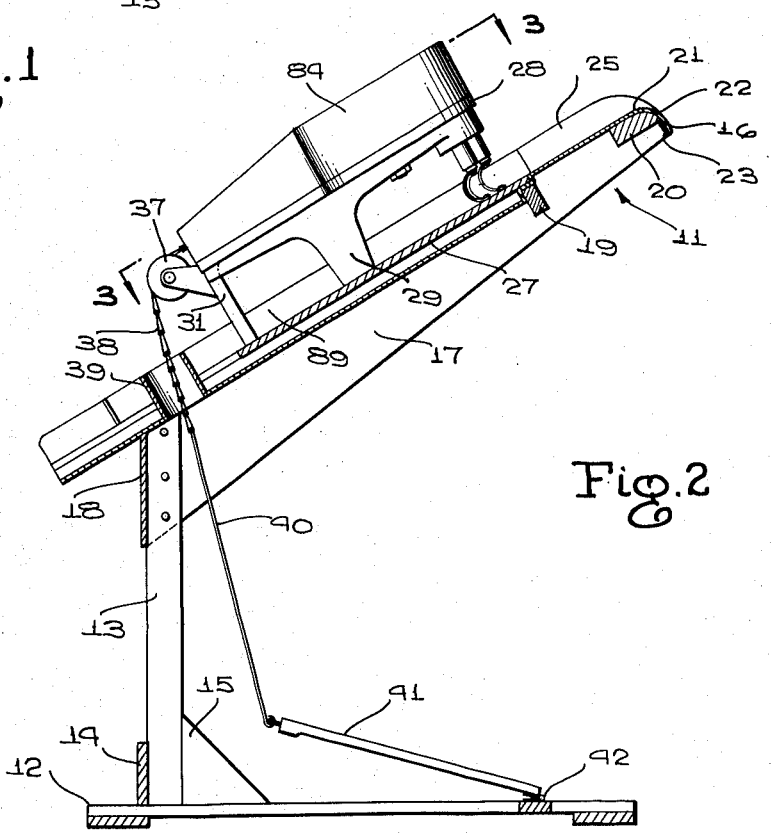
Figure 2 is a vertical cross sectional view taken on the line 2—2 of Figure 1.

Referring to the drawings, the machine is designated generally at 11 and comprises a base 12 which may be of any suitable shape, such as rectangular, to which is rigidly secured the vertical, upstanding support legs 13, 13. The legs 13 may be braced at their lower ends by the transverse frame bar 14 connecting the legs and may be further braced by the triangular brace plates 15 rigidly secured between the legs and the base 12, as shown in Figure 2.

Figure 1:
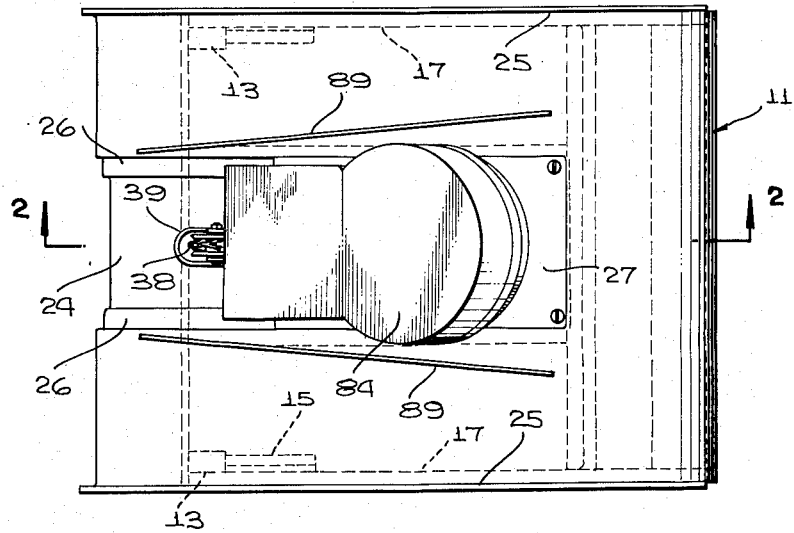
Figure 1 is a top plan view of an improved device for forming melon balls and similar shapes, said machine being constructed in accordance with the present invention.

Rigidly secured to the top ends of the legs 13 is the inclined table element 16, said table element comprising the supporting frame consisting of the side bars 17, 17 which are connected at the top ends of the post members 13, 13 by the transverse bar 18. Secured on the top edges of the side bars 17, 17 and the transverse bar 18 is the table board 19 of suitable sheet material, such as stainless steel sheet or other non-corrosive metal sheet, or alternatively of any suitable non-metallic material. Secured on the forward ends of the inclined side bars 17, 17 is a transverse bar 20 which defines a transverse rib at the upper end of the table, said rib being covered by the sheet material 19, as shown at 21, and said sheet material extending around the curved edge 22 of the bar member 20 and being formed with the terminating bottom bead 23, as shown in Figure 2. As shown in Figures 1 and 2, the table top 19 is formed with the intermediate, longitudinally extending recessed portion 24, the bar member 20 forming the forward margin of said recessed portion, said recessed portion defining an inclined trough extending longitudinally of the table and terminating at the rear edge thereof. The table board 19 is provided at its side edges with the upstanding flanges 25, 25 extending substantially the entire length of the table, as shown in Figures 1 and 2.

The trough 24 is formed with the longitudinal shoulder elements 26, 26 at its opposite sides, and secured on said shoulder elements is the support plate 27, said support plate thereby overlying the intermediate portion of the trough 24. Rigidly secured on the plate 27 is the housing base 28, said base being provided with the supporting side legs 29, 29 fastened to the plate 27 by the bolts 30 and with the rear leg 31 fastened to the plate 27 by the bolt 32.

As shown in Figure 6, the housing base 28 is provided with the generally circular forward portion 33 and with the rectangular rear portion 34. Rigidly secured to the rear edge of said portion 34 and projecting rearwardly and longitudinally from said rear edge are the parallel lugs 35, 35.

Secured transversely through said lugs 35 is the journal bolt 36, and rotatably mounted on said bolt is the pulley 37 over which extends the flexible chain member 38. The chain member 38 passes downwardly through the table board 19 through a cylindrical guide sleeve 39 formed in said table board, the end of the chain 38 being connected to the end of a rod member 40. The lower end of the rod member 40 is pivotally connected to the end of a treadle member 41, said treadle member being hinged at 42 to the base 12 and being located below the table 16, as is clearly shown in Figure 2.

Designated at 43 is a transversely extending channel member which is slidably mounted on a pair of longitudinally extending guide rods 44, 44, said rods 44 extending through the respective transverse ribs 45, and 46 provided on the housing base 27. As shown, the rods 44 are provided with the heads 47 at one end of each rod and are engaged by suitable retaining elements 48, 48 at their opposite ends, such as split rings or the like, received in suitable grooves provided in the rods, for restraining the rods 44, 44 against longitudinal movement relative to the ribs 45, 46. An adjustable stop screw 49 is threadedly engaged through the intermediate portion of the rib 45, as shown in Figure 4, said screw 49 being provided with a lock nut 50 for securing the screw in an adjusted position, serving as a stop to limit the rearward movement of the slidable channel member 43 on the rods 44, 44.

Secured on the slide channel 43 is the shouldered pivot bolt 51, said pivot bolt extending through the end link 52 of the flexible chain 38, as is clearly shown in Figures 3 and 4, thus connecting the chain to the slidable channel member 43. The pivot bolt 51 also extends through the overlapping ends of a pair of link bars 53 and 54, said link bars being provided with suitable bearing bushings 55 and 56 allowing link bars 53 and 54 to rotate freely relative to the pivot bolt 51.

Secured to the housing base 28 centrally of the circular portion 33 thereof is the upstanding shouldered pivot bolt 61 and rotatably mounted on said pivot bolt 61 for free rotation relative to each other on the pivot bolt are the respective, relatively large gears 62 and 63, said large gears 62 and 63 being substantially identical in size. Secured to the under surface of the upper gear 62 is the outwardly extending, radial arm 64 whose outer end is pivotally connected at 67 to the end of link bar 53. Secured to the top surface of the lower gear 63 is the outwardly extending radial arm 66 whose outer end is pivotally connected at 65 to the end of the link bar 54. It will be therefore apparent that when the treadle member 41 is depressed from the position thereof shown in Figure 2, namely, rotated about its hinge 42, the tension applied to the chain 38 causes the slidable channel member 43 to be moved rearwardly on the rods 44, 44, causing the link bars 54 and 53 to be rotated outwardly against the biasing force of respective springs 57 and 59. One end of the coiled spring 57 is connected to a depending pin element 68 provided on the upper gear 62, the other end of the coiled spring 57 being connected to the top end of an upstanding boss 58 provided on the rear portion of the housing base 28. The spring 57 biases the upper gear counterclockwise, as viewed in Figures 3, rotation of said upper gear being limited by the abutment of the channeled slide member 43 against the rib 46, since the torque of the upper gear is transmitted by the link bar 53 to the channel-shaped slide member 43. Similarly one end of the coiled spring 59 is connected to an upstanding pin element 69 provided on the top surface of the lower gear 63, the other end of the spring 59 being connected to an upstanding boss 60 provided on the rear portion of the housing base 28, as is clearly shown in Figures 4 and 5.

It will be therefore apparent that the springs 57 and 59 bias the gears in opposite directions, the upper gear 62 being biased counterclockwise, as viewed in Figure 3, and the lower gear 63 being biased clockwise, the gears being restrained against movement by the abutment of the slide member 43 against the rib 46. However, when tension is exerted on the flexible chain 38, the slide member 43 is moved rearwardly, transmitting torque respectively to the gears 62 and 63 by means of the link bars 54 and 53, causing said gears to be rotated in opposite directions against the biasing forces of the springs 57 and 59.

The circular portion 33 of the housing base 28 is formed at its forward marginal portion with the depending arcuate flange 70, said flange being arranged on an arc concentric with the gears 62 and 63. Secured vertically in said flange are a plurality of cylindrical depending bearing linings 71. Designated at 74 is a sleeve member which is rotatably received within each bearing lining 71 and on the top end of which is secured a pinion gear 75, as by a set screw 76, the pinion gears 75 meshing with the lower larger gear 63. Secured to the lower end of each sleeve 74 is the top end of a C-shaped cutting blade 77, said cutting blade being semi-circular in shape, for example, the lower end of the cutting blade 77 being pivotally connected at 78 to the housing base 28 on an axis aligned with the axis of the associated bearing sleeve 70. Thus, each C-shaped cutting blade 77 is rotated responsive to the rotation of the large gear 63, since rotation of said large gear 63 is transmitted to the pinion gears 75 and hence to the sleeve 74. The lower end of the C-shaped blade 77 is pivotally connected to the housing base 28 by a pivot pin 79 which extends through a shouldered bushing 80, as shown in Figure 4. Also pivotally engaged with the pin 79 is the lower end of another C-shaped blade 81 which is receivable inside the C-shaped blade 77, the upper end of the blade 81 being rigidly connected to the lower end of a shaft 82 rotatably disposed inside the sleeve 74. Secured on the top end of each shaft 72 is a pinion gear 82, the gear 82 being secured to the shaft 71 by a set screw 83, as shown in Figure 4, the pinion gears 82 meshing with the upper large gear 62. Therefore, the rotation of the respective upper gears 62 and 63 in opposite directions, as above described, responsive to the depression of the treadle member 41 causes the respective pairs of pinion gears 55 and 82 to be rotated in opposite directions, causing the respective semi-circular cutting blades 77 and 81 to be similarly rotated in opposite directions. Since the pinion gears 82 and 75 are relatively small as compared to the large gears 62 and 63, said pinion gears will be rotated through relatively large angles responsive to the relatively small angular rotation of the large gears 62 and 63. Thus, when the treadle 41 is depressed, the cutters 77 and 81 rotate through angles substantially more than 180° in response to the rotation of the large gears 62 and 63 as the channel-shaped slide member 43 is moved longitudinally on the rods 44, 44 between the ribs 46 and 45.

Designated at 84 is a housing cover which engages on the edges of the housing base 28, said cover being provided at its forward end with the hook flanges 85 for engagement beneath the forward edge portion of the housing base 28, and being provided at its rear end with the locking springs 86 which lockingly engage in suitable recesses 87 provided in the rear edge of the housing base 28. The cover 84 is formed at its rear wall with the notch 88 to provide clearance for the flexible chain 38, and the locking springs 86 and recesses 87 are preferably located adjacent the outer surfaces of the pulley lugs 35, 35 so that the springs 86 may engage said outer surfaces to assist in centering the cover.

Secured on the respective side portions of the table board 19 adjacent the respective opposite sides of the housing 84 and outwardly adjacent the respective longitudinal sides of the trough 24 are the rearwardly converging upstanding guide flanges 89, 89 which serve to guide the melon balls or other shapes cut from food objects rearwardly for collection in a suitable receptacle disposed beneath the rear end of the trough 24.

In operation, the melon or other food articles to be shaped are held against the semicircular blades 77, 81, said blades being normally in substantially superimposed positions, as shown in Figures 4 and 5. The operator then depresses the treadle 41, causing the cutting blades 77, 81 to be simultaneously rotated in opposite directions, as above described, whereby said blades cut spherical or other shapes of horizontal cross section in the melon or other food article, it being understood that the shape of the resultant product will depend upon the shape of the cutting blades 77 and 81. Assuming that the blades 77 and 81 are semicircular in shape, the resultant articles will be spherical, and a plurality of such articles will be formed responsive to a single depression of the treadle member 41. Upon withdrawing the melon section from the cutters after the balls have been cut, the balls will roll by gravity into a suitable receiving container or conveyor. Then when the treadle member 41 is released, the springs 57 and 59 return the large gears 62 and 63 to their normal positions, namely the positions in which the blades 77 and 81 are substantially superimposed.

It will be understood that if so desired, the machine may be operated by suitable power means, such as by a double acting air cylinder having its piston rod connected to channel member 43. The forward and reverse movement of the piston may be controlled by a suitable valve, opened and closed by the operator by the use of a treadle member, such as the treadle member 41.

While a specific embodiment of a machine for forming pieces of circular cross section from melons and similar food articles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A machine for forming pieces of circular cross section from melons and the like comprising a support frame, a plurality of pairs of relatively narrow, arcuately bowed cutting blades mounted on said frame, means supporting each pair of bowed cutting blades for independent rotation about a common axis, common drive means mounted on the frame, means drivingly coupling said drive means to each pair of blades, and means to effect simultaneous rotation of the respective pairs of cutting blades in opposite directions through angles of at least 180°, whereby pieces of circular cross section are cut from an object engaged with the blades.

2. A machine for forming pieces of circular cross section from melons and the like comprising a support frame, a plurality of pairs of C-shaped relatively narrow, arcuately bowed cutting blades mounted on said frame, means supporting each pair of bowed cutting blades for independent rotation about a common axis extending through their ends, common drive means mounted on the frame means drivingly coupling said drive means to each pair of blades and means to effect simultaneous rotation of the respective pairs of cutting blades in opposite directions through angles of at least 180°, whereby pieces of circular cross section are cut from an object engaged with the blades.

3. A machine for forming pieces of circular cross section from melons and the like comprising a support frame, a plurality of pairs of C-shaped relatively narrow, arcuately bowed cutting blades mounted on said frame, means supporting each pair of bowed cutting blades for independent rotation about a common axis extending through their ends, respective vertically spaced gear trains connected to the blades for rotating said blades about said axes, means for simultaneously actuating said gear trains in opposite directions and means to effect simultaneous rotation of the respective pairs of cutting blades in opposite directions through angles of at least 180° responsive to actuation of said gear trains, whereby pieces of circular cross section are cut from an object engaged with the blades.

4. A machine for forming pieces of circular cross section from melons and the like comprising a support frame, a plurality of pairs of C-shaped relatively narrow, arcuately bowed cutting blades mounted on said frame, means supporting each pair of bowed cutting blades for independent rotation about a common axis extending through their ends, respective vertically spaced gear trains connected to the blades for rotating said blades about said axes, each gear train comprising a relatively large main gear and respective smaller pinion gears connected to the respective blades, means mounting the main gears for rotation around a common axis, means for simultaneously actuating said gear trains in opposite directions and means to effect simultaneous rotation of the respective pairs of cutting blades in opposite directions through angles of at least 180° responsive to actuation of said gear trains, whereby pieces of circular cross section are cut from an object engaged with the blades.

5. A machine for forming pieces of circular cross section from melons and the like comprising a support frame, a plurality of pairs of C-shaped relatively narrow, arcuately bowed cutting blades mounted on said frame, means supporting each pair of bowed cutting blades for independent rotation about a common axis extending through their ends, respective vertically spaced gear trains connected to the blades for rotating said blades about said axes, each gear train comprising a relatively large main gear and respective smaller pinion gears connected to the respective blades, means mounting the main gears for rotation around a common axis and the pinion gears being in mesh with the main gears, respective link bars connected to the respective main gears, spring means biasing the main gears in opposite directions, actuating means connected to said link bars for rotating said main gears against the tension of said spring means, and means whereby said link bars and actuating means effect simultaneous rotation of the respective pairs of cutting blades in opposite directions through angles of at least 180° responsive to rotation of said main gears, whereby pieces of circular cross section are cut from an object engaged with the blades.

6. A machine for forming pieces of circular cross section from melons and the like comprising a support frame, a plurality of pairs of C-shaped relatively narrow, arcuately bowed cutting blades mounted on said frame, means supporting each pair of bowed cutting blades for independent rotation about a common axis extending through its ends, respectively vertically spaced gear trains connected to the blades for rotating said blades about said axes, each gear train comprising a relatively large main gear and respective smaller pinion gears connected to the respective blades, means mounting the main gears for rotation around a common axis and the pinion gears being in mesh with the main gears, respective link bars connected to the respective main gears, spring means biasing the main gears in opposite directions, pivot means connecting the ends of said link bars, a flexible member connected to said pivot means for rotating said main gears against the tension of said spring means, and means whereby said link bars and flexible member effect simultaneous rotation of the respective pairs of cutting blades in opposite directions to angles of at least 180° responsive to rotation of said main gears, whereby pieces of circular cross section are cut from an object engaged with the blades.

7. A machine for forming pieces of circular cross section from melons and the like comprising a support frame, a plurality of pairs of C-shaped relatively narrow, arcuately bowed cutting blades mounted on said frame, means supporting each pair of bowed cutting blades for independent rotation about a common axis extending through its ends, respective vertically spaced gear trains connected to the blades for rotating said blades about said axes, each gear train comprising a relatively large main gear and respective smaller pinion gears meshing with the main gears and connected to the respective blades, means mounting the main gears for rotation around a common axis, respective link bars connected to the respective main gears, spring means biasing the main gears in opposite directions, pivot means connecting the ends of said link bars, a flexible member connected to said pivot means, a treadle member pivoted to said support, means connecting said treadle member to the flexible member and means to effect simultaneous rotation of the respective pairs of cutting blades in opposite directions through angles of at least 180° responsive to rotation of said main gears, whereby pieces of circular cross section are cut from an object engaged with the blades.

8. A machine for forming pieces of circular cross section from melons and the like comprising a support frame, a plurality of pairs of C-shaped relatively narrow, arcuately bowed cutting blades mounted on said frame, means supporting each pair of bowed cutting blades for independent rotation about a common axis extending through its ends, respective vertically spaced gear trains connected to the blades for rotating said blades about said axes, each gear train comprising a relatively large main gear and respective smaller pinion gears connected to the respective blades, the pinion gears meshing with the main gears, means supporting the main gears for rotation around a common axis, respective link bars connected to the respective main gears, spring means biasing the main gears in opposite directions, pivot means connecting the ends of said link bars, a flexible member connected to said pivot means, a treadle member pivoted to said support, means connecting said treadle member to the flexible member and means to effect simultaneous rotation of the respective pairs of cutting blades in opposite directions through angles of at least 180° responsive to rotation of the main gears, whereby pieces of circular cross section are cut from an object engaged with the blades, and guide means on said support slidably supporting said pivot means for movement toward and away from said main gears.

References Cited in the file of this patent

UNITED STATES PATENTS

| | | |
|---|---|---|
| 900,573 | McCarren | Oct. 6, 1908 |
| 1,263,153 | Topalian | Apr. 16, 1918 |
| 2,023,037 | Thompson | Dec. 3, 1935 |
| 2,108,535 | Jepson | Feb. 15, 1938 |
| 2,109,598 | Stasinski et al. | Mar. 1, 1938 |
| 2,238,150 | Aquara et al. | Apr. 15, 1941 |
| 2,429,749 | Dunn | Oct. 28, 1947 |